(12) United States Patent
Ornella

(10) Patent No.: US 10,214,102 B2
(45) Date of Patent: Feb. 26, 2019

(54) DUAL DRIVE HYBRID DRIVELINE

(71) Applicant: Dana Italia SPA, Arco (IT)

(72) Inventor: Giulio Ornella, Arco (IT)

(73) Assignee: Dana Italia SPA, Arco (IT)

( * ) Notice: Subject to any disclaimer, the term of this patent is extended or adjusted under 35 U.S.C. 154(b) by 0 days.

(21) Appl. No.: 15/514,575

(22) PCT Filed: Sep. 24, 2015

(86) PCT No.: PCT/EP2015/072045
§ 371 (c)(1),
(2) Date: Mar. 27, 2017

(87) PCT Pub. No.: WO2016/050617
PCT Pub. Date: Apr. 7, 2016

(65) Prior Publication Data
US 2017/0305267 A1    Oct. 26, 2017

(30) Foreign Application Priority Data
Oct. 2, 2014 (EP) .................................. 14425120

(51) Int. Cl.
*B60K 17/356* (2006.01)
*B60K 17/10* (2006.01)
(Continued)

(52) U.S. Cl.
CPC ............ *B60K 17/10* (2013.01); *B60K 17/356* (2013.01); *F16H 61/4096* (2013.01); *F16H 61/444* (2013.01); *F16H 2047/025* (2013.01)

(58) Field of Classification Search
CPC ..... B60K 6/12; B60K 17/356; F16H 61/4061; F16H 61/4096; F16H 61/44; F16H 61/444
See application file for complete search history.

(56) References Cited

U.S. PATENT DOCUMENTS

| 4,760,697 A | 8/1988 | Heggie et al. |
| 4,815,334 A | 3/1989 | Lexen |

(Continued)

FOREIGN PATENT DOCUMENTS

| CN | 1394273 | 1/2003 |
| CN | 201176978 Y | 1/2009 |

(Continued)

OTHER PUBLICATIONS

Machine translation of DE 10 2006 017 581 A1; Sep. 13, 2007.*
(Continued)

*Primary Examiner* — Emma K Frick
(74) *Attorney, Agent, or Firm* — Marshall & Melhorn, LLC

(57) ABSTRACT

A dual drive driveline for a vehicle has a power source, a hydrostatic pump drivingly engaged with the power source, a first axle, a second axle, and a first hydrostatic unit in fluid communication with the hydrostatic pump. The first hydrostatic unit is drivingly engaged or selectively drivingly engaged with the first axle, and the first hydrostatic unit is not drivingly engageable with the second axle. A second hydrostatic unit in fluid communication with the hydrostatic pump, the second hydrostatic unit being drivingly engaged or selectively drivingly engaged with the second axle, and the second hydrostatic unit not being drivingly engageable with the first axle. A control unit is adapted to control a hydraulic displacement of at least one of the hydrostatic pump, the first hydrostatic unit and the second hydrostatic unit.

7 Claims, 6 Drawing Sheets

(51) Int. Cl.
*F16H 61/4096* (2010.01)
*F16H 61/444* (2010.01)
*F16H 47/02* (2006.01)

(56) References Cited

U.S. PATENT DOCUMENTS

| | | | |
|---|---|---|---|
| 5,518,461 A | 5/1996 | Pfordt | |
| 5,579,640 A | 12/1996 | Gray, Jr. et al. | |
| 5,887,674 A | 3/1999 | Gray, Jr. | |
| 6,622,484 B2 | 9/2003 | Hopkins | |
| 6,719,080 B1 | 4/2004 | Gray, Jr. | |
| 7,669,414 B2 | 3/2010 | Loeffler | |
| 7,870,727 B2 | 1/2011 | Mueller et al. | |
| 7,926,265 B2 | 4/2011 | Mueller et al. | |
| 7,934,779 B2 | 5/2011 | Kodama | |
| 7,984,783 B2 | 7/2011 | Gray, Jr. et al. | |
| 8,108,111 B2 | 1/2012 | Stein et al. | |
| 8,162,094 B2 | 4/2012 | Gray, Jr. et al. | |
| 8,616,323 B1 | 12/2013 | Gurin | |
| 8,959,905 B2 | 2/2015 | Baltes et al. | |
| 8,991,167 B2 | 3/2015 | Yuan et al. | |
| 9,032,723 B2 | 5/2015 | Haugen | |
| 9,057,389 B2 | 6/2015 | Opdenbosch | |
| 9,096,115 B2 | 8/2015 | Ho | |
| 9,765,502 B2 | 9/2017 | Heybroek | |
| 9,802,469 B2* | 10/2017 | Ornella | B60K 6/12 |
| 9,919,737 B2* | 3/2018 | Claas | B62D 11/10 |
| 2004/0251067 A1 | 12/2004 | Gray, Jr. et al. | |
| 2006/0243515 A1 | 11/2006 | Okada et al. | |
| 2009/0165451 A1* | 7/2009 | Mueller | B60K 6/12 60/478 |
| 2011/0232418 A1 | 9/2011 | Gray, Jr. et al. | |
| 2011/0314801 A1 | 12/2011 | Baltes et al. | |
| 2012/0090308 A1 | 4/2012 | Yuan et al. | |
| 2012/0178570 A1 | 7/2012 | Gray, Jr. et al. | |
| 2012/0233991 A1 | 9/2012 | Ivantysynova et al. | |
| 2012/0240564 A1 | 9/2012 | Wesolowski et al. | |
| 2013/0081385 A1 | 4/2013 | Opdenbosch | |
| 2013/0133318 A1 | 5/2013 | Vogl | |
| 2015/0113969 A1 | 4/2015 | Kochhan et al. | |
| 2016/0059694 A1* | 3/2016 | Heren | F16H 61/431 180/197 |
| 2016/0341309 A1* | 11/2016 | Serrao | B60K 6/12 |
| 2016/0361986 A1* | 12/2016 | Ornella | B60K 17/02 |
| 2017/0015197 A1* | 1/2017 | Lambey | B60K 17/356 |
| 2017/0067489 A1* | 3/2017 | Versteyhe | F15B 1/033 |
| 2017/0072778 A1* | 3/2017 | Ornella | B60K 25/06 |
| 2017/0305267 A1* | 10/2017 | Ornella | B60K 17/10 |
| 2017/0335867 A1* | 11/2017 | Meehan | B60K 6/12 |

FOREIGN PATENT DOCUMENTS

| | | |
|---|---|---|
| CN | 102518169 A | 6/2012 |
| CN | 102734237 A | 10/2012 |
| DE | 19931208 A1 | 1/2001 |
| DE | 102006017581 A1 | 9/2007 |
| DE | 102006060014 B4 | 5/2009 |
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2012 |
| WO | 9634213 A1 | 10/1996 |
| WO | 9713650 A1 | 4/1997 |
| WO | 0151870 A1 | 7/2001 |
| WO | 2007035997 A1 | 4/2007 |
| WO | 2008012558 A2 | 1/2008 |
| WO | 2010072299 A1 | 7/2010 |
| WO | 2011112663 A2 | 9/2011 |
| WO | 2012125798 A1 | 9/2012 |
| WO | 2013121126 A1 | 8/2013 |
| WO | 2013159851 A1 | 10/2013 |

OTHER PUBLICATIONS

Extended European Search Report for Application No. 14425120.4 dated Apr. 21, 2015, issued by the EPO.
International Search Report and Written Opinion for Application No. PCT/EP2015/072045, dated Oct. 21, 2015, issued by the EPO.
Machine-generated English Translation of DE19931208, obtained via Espacenet Patent Search.
Machine-generated English Translation of CN201176978, obtained via Espacenet Patent Search.
Machine-generated English Translation of CN102518169, obtained via Espacenet Patent Search.
Machine-generated English Translation of CN102734237, obtained via Espacenet Patent Search.
Chinese Office Action issued by the Chinese State Intellectual Property Office dated Sep. 20, 2017.
The State Intellectual Property Office of the People's Republic of China; Office Action issued in the parallel Chinese application No. CN201580006877.4; dated Apr. 21, 2017; 15 pages; The State Intellectual Property Office of the People's Republic of China, Beijing, Republic of China.

* cited by examiner

DUAL DRIVE HYBRID DRIVELINE

BACKGROUND OF THE INVENTION

The present invention relates to a dual drive driveline for vehicles. The invention further relates to a vehicle comprising said driveline, in particular to an off-highway vehicle such as an agricultural vehicle or a wheel loader.

Dual drive hydrostatic transmission drivelines known from the prior art typically include a power source in driving engagement with a hydrostatic pump and two hydrostatic motors in fluid communication with the hydrostatic pump. Generally, the output torque of the first hydrostatic motor and the output torque of the second hydrostatic motor are summed in a summing gearbox. From an output shaft of the summing gearbox the summed torque is transmitted to at least one vehicle axle or wheel shaft. Typically, the torque transmission from the output shaft of the summing gearbox to the axle is realized using at least one driveshaft and at least one bevel set.

In order to improve the overall transmission efficiency of the driveline and in order to reduce energy consumption, the summing gearbox is often configured such that the ratio of motor output torque to the output torque of the summing gearbox differs for the two motors. For example, said ratio is smaller for the first motor than for the second motor. In this case, the driveline is usually configured such that the first motor can be disengaged at higher vehicle speeds in order to avoid overspeeding of the first motor. Thus, at low vehicle speed both motors are used to provide the maximum output torque while at high vehicle speed, for example above a threshold vehicle speed, only the second motor is engaged. In this way, energy consumption and overall losses can be reduced.

However, despite these improvements a need for even more efficient drivelines continues to exist. In the off-highway market in particular there is a growing demand for drivelines that allow the transmission to be adapted to different driving conditions such as vehicle speed or ground conditions.

SUMMARY OF THE INVENTION

Thus, the technical problem underlying the present invention consists of providing a dual drive driveline with further improved energy efficiency and flexibility.

This problem is solved by the dual drive driveline according to claim 1 and by a vehicle comprising said dual drive driveline.

The presently proposed dual drive driveline comprises at least:
 a power source;
 a hydrostatic pump drivingly engaged with the power source;
 a first axle;
 a second axle;
 a first hydrostatic unit in fluid communication with the hydrostatic pump, the first hydrostatic unit being drivingly engaged or selectively drivingly engaged with the first axle, and the first hydrostatic unit not being drivingly engageable with the second axle;
 a second hydrostatic unit in fluid communication with the hydrostatic pump, the second hydrostatic unit being drivingly engaged or selectively drivingly engaged with the second axle, and the second hydrostatic unit not being drivingly engageable with the first axle; and
 a control unit, the control unit being adapted to control a hydraulic displacement of the hydrostatic pump and/or of the first hydrostatic unit and/or of the second hydrostatic unit.

In other words, the first hydrostatic unit is drivingly engaged or drivingly engageable only with the first axle, and the second hydrostatic unit is drivingly engaged or drivingly engageable only with the second axle. In combination with the fact that the control unit is configured to control the hydraulic displacement of at least one of or all of the hydrostatic pump, the first hydrostatic unit and the second hydrostatic unit, the control unit is adapted to control the torque provided at the first axle and at the second axle in a particularly flexible manner. The control unit is also termed central hydraulic differential. For example, the control unit can be adapted to control the torque provided at the first axle and at the second axle based on current driving conditions or based on an input signal provided by an operator of the vehicle.

The control unit may replace the summing gearbox, the driveshaft and the bevel set used in dual drive drivelines known from the prior art as described above. In other words, an output shaft of the first hydrostatic unit may be drivingly engaged or drivingly engageable with the first axle without at least one of or without each of a gearbox, a driveshaft and a bevel set. Additionally or alternatively, an output shaft of the second hydrostatic unit may be drivingly engaged or drivingly engageable with the second axle without at least one of or without each of a gearbox, a driveshaft and a bevel set. By reducing the number of transmission parts in this manner, overall transmission losses are reduced and the transmission efficiency is improved. Furthermore, removing any driveshafts, gearboxes and bevel sets lowers production costs and overall weight, prolongs the longevity of the driveline and provides better parts installation freedom.

The power source may be an internal combustion engine or an electric motor, for example. The hydrostatic pump may be a variable displacement pump, such as an axial piston pump or a radial piston pump as is known in the art. At least one of the first hydrostatic unit and the second hydrostatic unit may be a variable displacement hydrostatic motor, such as an axial piston motor or a radial piston motor as is known in the art. Preferably, at least one of the first and the second hydrostatic unit is a reversible hydrostatic motor whose output shaft is configured to turn in both directions. The hydrostatic pump being in fluid communication with the first hydrostatic unit may include the hydrostatic pump being fluidly connected or selectively fluidly connected to the first hydrostatic unit using a valve. The hydrostatic pump being in fluid communication with the second hydrostatic unit may include the hydrostatic pump being fluidly connected or selectively fluidly connected to the second hydrostatic unit using a valve. The first hydrostatic unit and the second hydrostatic unit may be in parallel fluid communication with the hydrostatic pump or may be configured to be in parallel fluid communication with the hydrostatic pump, for example through one or more fluid control valves. This typically includes that the hydrostatic pump and the hydrostatic units are in fluid communication in such a way that the hydrostatic pump applies or may apply the same fluid pressure to the first hydrostatic unit and to the second hydrostatic unit.

The control unit may be configured to control the hydraulic circuit including the hydrostatic pump, the first hydrostatic unit and the second hydrostatic unit such that the mechanical energy or the output torque provided by the power source or a portion of said energy/output torque may be split between the first axle and the second axle according to a multitude of combinations.

In an embodiment, the proposed dual drive driveline includes a first clutching device configured to selectively drivingly engage the output shaft of the first hydrostatic unit with the first axle. That is, the first clutching device is configured to either drivingly engage the output shaft of the first hydrostatic unit with the first axle or to disengage the output shaft of the first hydrostatic unit from the first axle. Additionally or alternatively, the proposed dual drive driveline may include a second clutching device configured to selectively drivingly engage the output shaft of the second hydrostatic unit with the second axle. That is, the second clutching device is configured to either drivingly engage the output shaft of the second hydrostatic unit with the second axle or to disengage the output shaft of the second hydrostatic unit from the second axle. The control unit may be adapted to control at least one of the first clutching device and the second clutching device. Additionally or alternatively, the clutching device may be configured to be actuated based on an input signal provided by an operator of the vehicle through a corresponding input device such as a pedal, arm or knob.

In a further embodiment of the proposed dual drive driveline, an output shaft of the first hydrostatic unit or an output shaft of the first clutching device is in direct driving engagement with the first axle or with a first differential of the first axle. Here and in the following, the term "direct driving engagement" between an axle and a shaft or between two shafts may include that gears fixed to the respective axle/shaft are directly engaged with each other; that said gears fixed to the respective axle/shaft are drivingly engaged through one or more idle gears excluding any further transmission parts; or that the respective axle/shaft are directly engaged with each other through a chain or a belt.

The first hydrostatic unit may be directly connected to the first differential or even integrated into the first axle differential. Usually, the input of the first differential is configured as or includes a gear which may replace the traditional ring gear. Typically, the output shaft of the first hydrostatic unit is arranged perpendicular to the first axle. Accordingly, no pinion is required in the transmission between the first hydrostatic unit and the input of the first differential. In this embodiment, the mechanical transmission between the output shaft of the first hydrostatic unit or, alternatively, the output shaft of the first clutching device on the one hand and the first axle or, alternatively, the first differential on the other includes no gearbox, driveshaft or bevel set. As the traditional axle bevel set may cause significant losses, the efficiency of the presently proposed transmission may be significantly increased with respect to transmissions known from the prior art. In particular, the first hydrostatic unit may be disposed directly at the first axle. This may include that a distance between the first hydrostatic unit and the first axle is smaller than one meter, smaller than half a meter or smaller than 30 centimeters. It is even conceivable that the proposed dual drive driveline features no differential at the first axle. Instead, the dual drive driveline may comprise two (first) hydrostatic units arranged at the first axle each of which is connected to one of the two half shafts of the first axle.

Additionally or alternatively, an output shaft of the second hydrostatic unit or an output shaft of the second clutching device may be in direct driving engagement with the second axle or with a second differential of the second axle. The second hydrostatic unit may be directly connected to the second differential or even integrated into the second axle differential. Usually, the input of the second differential is configured as or includes a gear which may replace the traditional ring gear. Typically, the output shaft of the second hydrostatic unit is arranged perpendicular to the second axle. Accordingly, no pinion is required in the transmission between the second hydrostatic unit and the input of the second differential. In this embodiment, the mechanical transmission between the output shaft of the second hydrostatic unit or, alternatively, the output shaft of the second clutching device on the one hand and the second axle or, alternatively, the second differential on the other includes no gearbox, driveshaft or bevel set. In particular, the second hydrostatic unit may be disposed directly at the second axle. This may include that a distance between the second hydrostatic unit and the second axle is smaller than one meter, smaller than half a meter or smaller than 30 centimeters. Again, it is conceivable that the proposed dual drive driveline features no differential at the second axle. Instead, the dual drive driveline may comprise two (second) hydrostatic units arranged at the second axle each of which is connected to one of the two half shafts of the second axle.

In a further embodiment of the proposed dual drive driveline, the first hydrostatic unit is selectively drivingly engaged with the first axle through a first mechanical gearbox with two-ratio capability. In this case, the output shaft of the first mechanical gearbox is preferably in direct driving engagement with the first axle or with the input shaft of the first differential. Additionally or alternatively, the second hydrostatic unit may be selectively drivingly engaged with the second axle through a second mechanical gearbox with two-ratio capability, wherein an output shaft of the second mechanical gearbox is preferably in direct driving engagement with the second axle or with the input shaft of the second differential. Including an additional mechanical gearbox between the first hydrostatic unit and the first axle or between the second hydrostatic unit and the second axle adds further possibilities of splitting the mechanical energy or the output torque provided by the power source or a portion of said energy/output torque between the first axle and the second axle, thereby adding to the flexibility and versatility of the dual drive driveline.

In a further embodiment, the proposed dual drive driveline includes at least one fluid control valve for selectively fluidly connecting the hydrostatic pump to the first hydrostatic unit and/or to the second hydrostatic unit. The at least one fluid control valve can have at least three control states, the control states corresponding to different configurations of the hydraulic circuit including the hydrostatic pump, the first hydrostatic unit and the second hydrostatic unit.

The hydraulic circuit and the fluid control valve may be configured such that, when the fluid control valve is in the first control state, the hydrostatic pump is in parallel fluid communication with the first hydrostatic unit and the second hydrostatic unit. The hydraulic circuit and the fluid control valve may be configured such that, when the fluid control valve is in the second control state, the hydrostatic pump is in fluid communication with the first hydrostatic unit and fluidly disconnected from the second hydrostatic unit. And the hydraulic circuit and the fluid control valve may be configured such that, when the fluid control valve is in the third control state, the hydrostatic pump is in fluid communication with the second hydrostatic unit and fluidly disconnected from the first hydrostatic unit. In a further embodiment, the fluid control valve may further have a fourth control state. The hydraulic circuit and the fluid control valve may then be configured such that, when the fluid control valve is in the fourth control state, the hydrostatic pump is fluidly disconnected from the first and the second hydrostatic unit.

Typically, the hydrostatic pump, the first hydrostatic unit and the second hydrostatic unit each have a first fluid port and a second fluid port. In a further embodiment of the proposed dual drive driveline, the at least one fluid control valve includes a first fluid control valve and a second fluid control valve. The first fluid control valve and the second fluid control valve may be connected such that the first fluid port of the hydrostatic pump may be selectively fluidly connected to the first fluid port of the first hydrostatic unit and to the first fluid port of the second hydrostatic unit through the first fluid control valve; and that the second fluid port of the hydrostatic pump may be selectively fluidly connected to the second fluid port of the first hydrostatic unit and to the second fluid port of the second hydrostatic unit through the second fluid control valve.

The fluid lines connecting the hydrostatic pump, the first hydrostatic unit and the second hydrostatic unit, the first fluid control valve and the second fluid control valve may then furthermore be configured such that:

in the above described first control state, the first fluid control valve fluidly connects the first fluid port of the hydrostatic pump to the first fluid ports of the first and the second hydrostatic unit, and the second fluid control valve fluidly connects the second fluid port of the hydrostatic pump to the second fluid ports of the first and the second hydrostatic unit;

in the above described second control state, the first fluid control valve and the second control valve fluidly connect the first and the second fluid port of the hydrostatic pump to the first and the second fluid port of the first hydrostatic unit, and fluidly disconnect the hydrostatic pump from the second hydrostatic unit; and in the above described third control state, the first fluid control valve and the second control valve fluidly connect the first and the second fluid port of the hydrostatic pump to the first and the second fluid port of the second hydrostatic unit, and fluidly disconnect the hydrostatic pump from the first hydrostatic unit.

The at least one fluid control valve further increases the possibilities of splitting the mechanical energy or the output torque provided by the power source or a portion of said energy/output torque between the first hydrostatic unit and the second hydrostatic unit or between the first axle and the second axle, thereby extending the flexibility and versatility of the dual drive driveline.

In a further embodiment, the proposed dual drive driveline comprises a hydraulic accumulator assembly. The accumulator assembly is connected to the hydraulic circuit in such a way that it is adapted to be in fluid communication with the hydrostatic pump and/or with the first hydrostatic unit and/or with the second hydrostatic unit. The hydraulic accumulator assembly and the hydraulic circuit are usually connected such that the accumulator assembly may be charged by transferring hydrostatic energy from the hydrostatic pump and/or the first hydrostatic unit and/or the second hydrostatic unit to the accumulator assembly; or that the accumulator assembly may be discharged by transferring hydrostatic energy from the accumulator assembly to the first hydrostatic unit and/or to the second hydrostatic unit.

Usually, the accumulator assembly comprises at least one high pressure accumulator and at least one low pressure accumulator. Preferably, the hydrostatic pressure in the high pressure accumulator is kept within the pressure range of the working pressure in the hydraulic circuit including the hydrostatic pump, the first hydrostatic unit and the second hydrostatic unit. Typically, the hydrostatic pressure in the high pressure accumulator is at least 100 bar. Additionally or alternatively, the hydrostatic pressure in the high pressure accumulator may be up to 500 bar. The hydrostatic pressure in the low pressure accumulator is usually kept at the hydrostatic pressure in the return line of the closed hydraulic circuit. The hydrostatic pressure in the low pressure accumulator may be at least 30 bar. Additionally or alternatively, the hydrostatic pressure in the low pressure accumulator may be up to 30 bar.

The dual drive driveline may additionally comprise at least one accumulator valve for selectively fluidly connecting the accumulator assembly to at least one of or each of the hydrostatic pump, the first hydrostatic unit and the second hydrostatic unit. The accumulator valve may have at least three control positions. The fluid lines connecting the accumulator assembly, the accumulator valve and the hydraulic circuit may be arranged such that, when the accumulator valve is in the second control position, the accumulator assembly is fluidly disconnected from the hydrostatic pump, the first hydrostatic unit and the second hydrostatic unit; and when the accumulator valve is in the first or in the third control position, the hydraulic accumulator is in parallel fluid communication with the hydrostatic pump, the first hydrostatic unit and the second hydrostatic unit.

For example, the accumulator valve being in the first control position may include the accumulator valve fluidly connecting the high pressure accumulator to the first fluid ports of the hydrostatic pump and the hydrostatic units, and fluidly connecting the low pressure accumulator to the second fluid ports of the hydrostatic pump and the hydrostatic units. The accumulator valve being in the third control position may include the accumulator valve fluidly connecting the high pressure accumulator to the second fluid ports of the hydrostatic pump and the hydrostatic units, and fluidly connecting the low pressure accumulator to the first fluid ports of the hydrostatic pump and the hydrostatic units.

In a further embodiment of the proposed dual drive driveline, the control unit is adapted to control at least one control device based on at least one sensor signal, for example according to a control algorithm.

The control device may include at least one of or each of:
the actuator for controlling the hydraulic displacement of the hydrostatic pump;
the actuator for controlling the hydraulic displacement of the first hydrostatic unit;
the actuator for controlling the hydraulic displacement of the second hydrostatic unit;
the at least one fluid control valve for selectively fluidly connecting the hydrostatic pump to the first hydrostatic unit and/or to the second hydrostatic unit;
the accumulator valve for selectively fluidly connecting the hydraulic accumulator assembly to at least one of or each of the hydrostatic pump, the first hydrostatic unit and the second hydrostatic unit;
the first clutching device for selectively drivingly engaging the first hydrostatic unit with the first axle; and
the second clutching device for selectively drivingly engaging the second hydrostatic unit with the second axle;
the first mechanical gearbox with two-ratio capability; and
the second mechanical gearbox with two-ratio capability for selectively drivingly engaging the second hydrostatic unit with the second axle.

The sensor signal may indicate at least one of or each of:
the hydraulic displacement of the hydrostatic pump;
the hydraulic displacement of the first hydrostatic unit;
the hydraulic displacement of the second hydrostatic unit;
a rotational speed of an output shaft of the power source;
a rotational speed of the first axle;
a rotational speed of the second axle;
a hydrostatic pressure in the high pressure accumulator;
a hydrostatic pressure in the low pressure accumulator; and
a pneumatic pressure of at least one vehicle tire.

The proposed dual drive driveline typically includes at least one sensor for detecting the sensor signal/signals. The sensor may include one or several hydraulic displacement sensors, one or several (rotational) speed sensors, one or several torque sensors, one or several hydrostatic pressure sensors and/or one or several pneumatic pressure sensors. The control unit may be adapted to control the at least one control device electronically. For example, the control device may be controlled via an electronic signal from the control unit. The control unit may be adapted to control each control device based on at least one or each of the sensor signals. The control unit may be adapted to control the control devices independently. Controlling the actuator for varying the hydraulic displacement of the hydrostatic pump, the first hydrostatic unit or the second hydrostatic unit may include tuning the hydraulic displacement of the respective actuator to a displacement value determined by the control unit, for example by means of a control algorithm. Controlling the hydraulic displacement may include increasing the displacement, decreasing the displacement or keeping the displacement constant. Controlling the at least one fluid control valve may include switching the fluid control valve to one of its respective control states. Controlling the accumulator valve may include switching the accumulator valve to one of its control positions.

Additionally or alternatively, the control unit may be configured to control the at least one control device based on input signals provided by the operator of the vehicle. For example, the input signal may be provided using an accelerator pedal of the vehicle, wherein different pedal positions are associated with different input signals.

Also, a vehicle including the dual drive driveline is proposed. Typically, the vehicle is an off-highway vehicle. For example, the vehicle may be an agricultural vehicle such as a tractor or a harvester. Alternatively, the vehicle may be a wheel loader, a dumper, a crawler, a wheeled excavator, a telehandler, a backhoe loader, or the like.

BRIEF DESCRIPTION OF THE DRAWINGS

Special embodiments of the present invention are depicted in the figures and are explained in the following description.

DETAILED DESCRIPTION OF THE INVENTION

Figure 1:
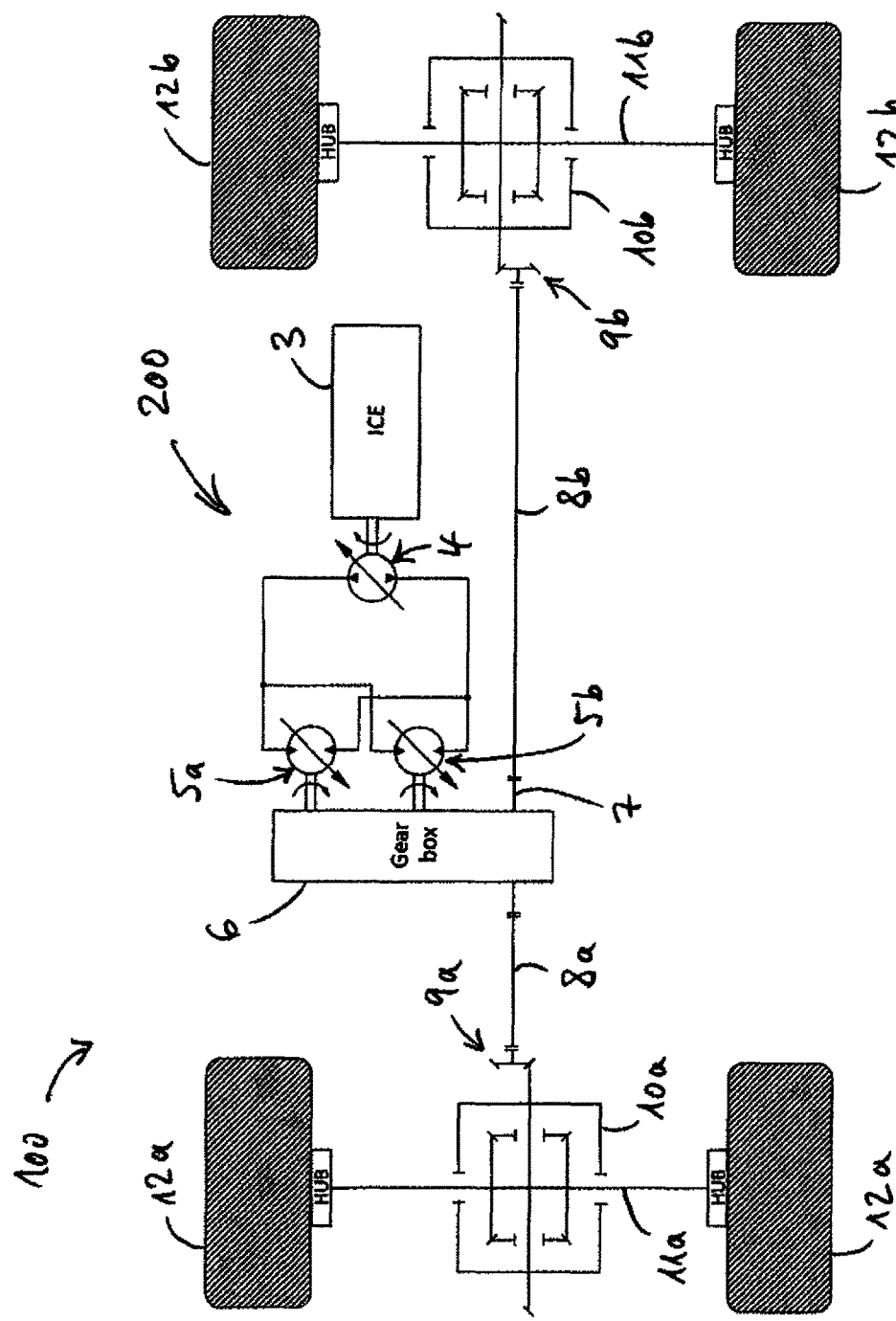
FIG. 1 shows a vehicle featuring a dual drive driveline as known from the prior art, the driveline including a power source, a hydrostatic pump, a first hydrostatic motor, a second hydrostatic motor, a first vehicle axle and a second vehicle axle, wherein the vehicle axles are drivingly engaged with the hydrostatic motors through a summing gearbox, drive shafts and bevel sets.

FIG. 1 schematically depicts a vehicle 100 with a dual drive driveline 200 known from the prior art. The driveline 200 includes an internal combustion engine (ICE) 3 drivingly engaged with a hydrostatic pump 4. The hydrostatic pump 4 is in parallel fluid communication with a first hydrostatic unit 5a and with a second hydrostatic unit 5b. Typically, the hydrostatic units 5a, 5b are configured as hydrostatic motors, respectively. The output torque of the hydrostatic motors 5a, 5b may be selectively summed in a summing gearbox 6 and transmitted to an output shaft 7 of the summing gearbox 6. That is, depending on current driving conditions, one or both of the hydrostatic units 5a, 5b may be drivingly engaged with the output shaft 7. From the output shaft 7 the torque is transmitted to a set of front wheels 12a and to a set of rear wheels 12b through drive shafts 8a, 8b, bevel sets 9a, 9b, differentials 10a, 10b, a first (front) axle 11a and a second (rear) axle 11b. The present invention aims at providing an improved dual drive driveline with increased efficiency and flexibility.

Figure 2:
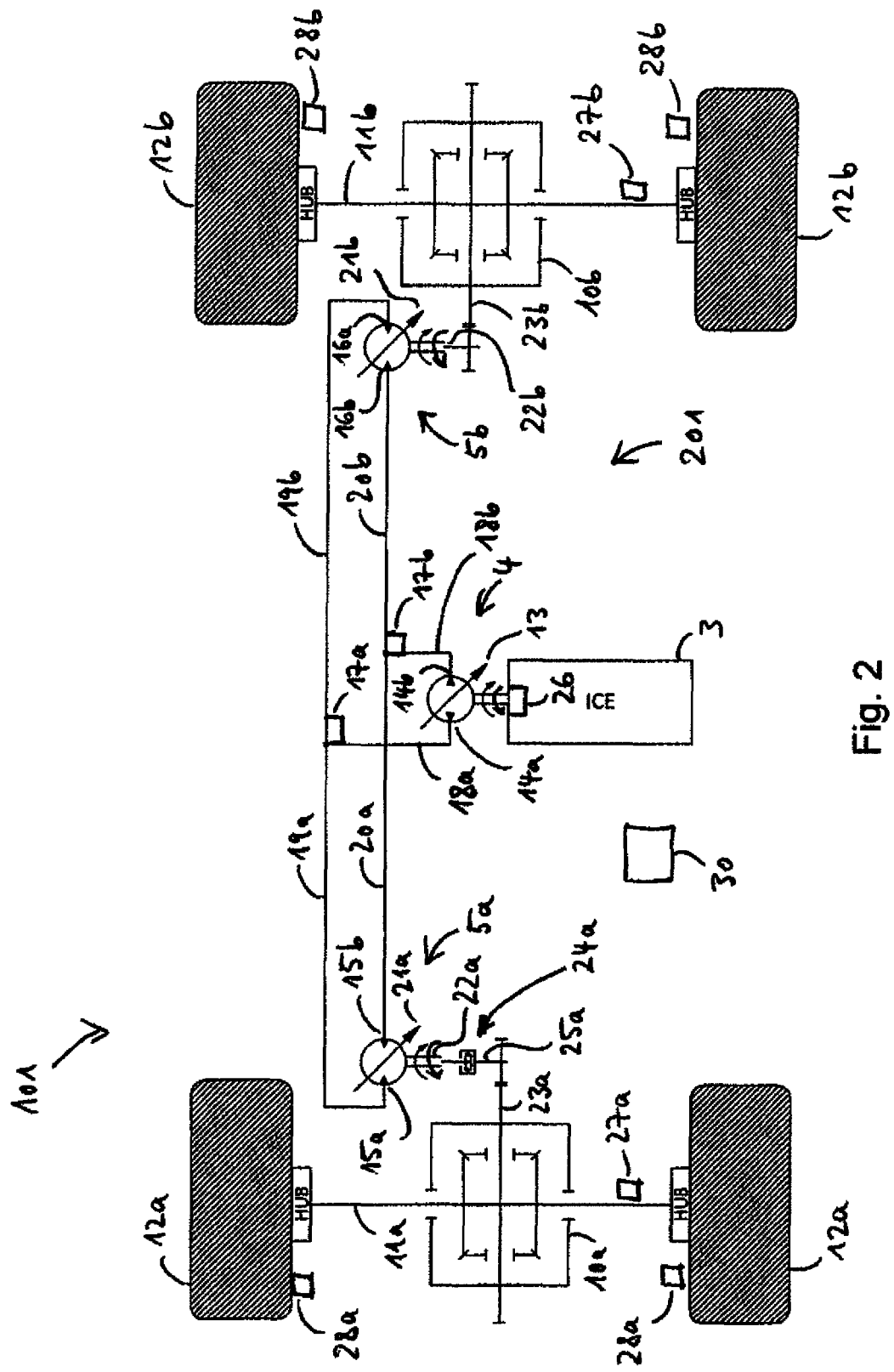
FIG. 2 shows a vehicle featuring a first embodiment of the dual drive driveline according to the present invention, the driveline including a hydrostatic pump in fluid communication with a first and a second hydrostatic unit through corresponding fluid control valves, and the driveline further including a control unit.

FIG. 2 shows a vehicle 101, in particular a wheel loader including a dual drive driveline 201 in accordance with the present invention. Here and in the following, recurring features are designated with identical reference numerals. The driveline 201 includes a power source 3, in particular an ICE, drivingly engaged with a hydrostatic pump 4. The hydrostatic pump 4 is a hydraulic axial piston pump comprising a movable swashplate (not shown) for varying the hydraulic displacement of the pump 4. The hydraulic displacement is the fluid volume moved or conveyed per revolution. The pump 4 further includes an actuator 13 for varying the hydraulic displacement of the pump 4 by moving the swashplate. Variable displacement hydraulic pumps of this sort are generally known in the art.

The driveline 201 further includes a first hydrostatic unit 5a and a second hydrostatic unit 5b. Each of the hydrostatic units 5a, 5b is configured as a reversible hydraulic axial piston motor comprising a movable swashplate (not shown) for varying the hydraulic displacement of the respective hydrostatic unit 5a, 5b. The hydrostatic units 5a, 5b include corresponding actuators 21a, 21b for varying the hydraulic displacement of the respective unit 5a, 5b by moving the respective swashplate. The hydrostatic units 5a, 5b further include output shafts 22a, 22b which provide a corresponding output torque. The output torque provided by the output shafts 22a, 22b of the hydrostatic units 5a, 5b or a portion thereof is transmitted to the front axle 11a and/or to the rear axle 11b for driving the front wheels 12a and/or the rear wheels 12b of the vehicle 101. The output shaft 22a of the first hydrostatic unit 5a can only be engaged with the first axle 11a; it is arranged such that it cannot be engaged with the second axle 11b. Analogously, the output shaft 22b of the second hydrostatic unit 5b is solely engaged with the second axle 11b; it is arranged such that it cannot be engaged with the first axle 11a.

The hydrostatic units 5a, 5b are in fluid communication with the hydrostatic pump 4. The hydrostatic pump 4 and the hydrostatic units 5a, 5b have first fluid ports 14a, 15a, 16a and second fluid ports 14b, 15b, 16b. The hydrostatic pump 4 is in fluid communication with the hydrostatic units 5a, 5b through fluid control valves 17a, 17b. The first fluid port 14a of the hydrostatic pump 4 is selectively fluidly connected to the first fluid ports 15a, 16a of the hydrostatic units 5a, 5b through the first fluid control valve 17a and through fluid lines 18a, 19a, 19b. Analogously, the second fluid port 14b of the hydrostatic pump 4 is selectively fluidly connected to the second fluid ports 15b, 16b of the hydrostatic units 5a, 5b through the second fluid control valve 17b and through fluid lines 18b, 20a, 20b.

Figure 3:
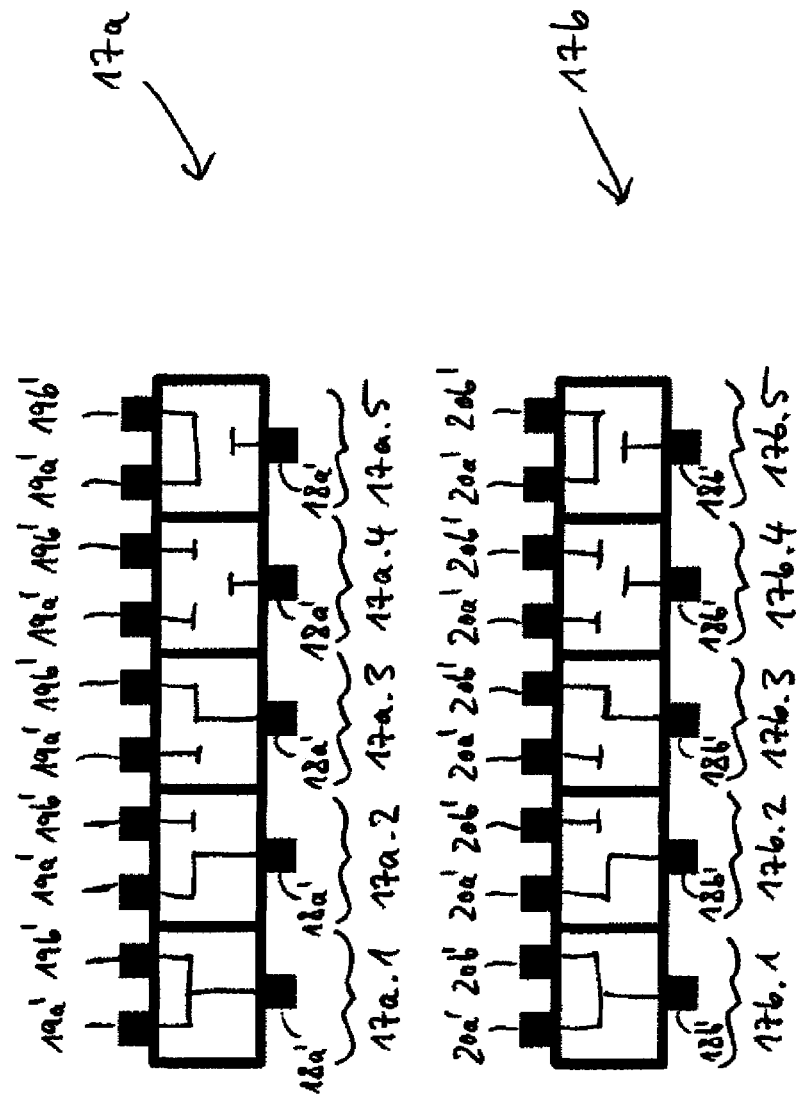
FIG. 3 shows a detailed view of the fluid control valves of FIG. 2.

FIG. 3 shows a detailed view of the identical fluid control valves 17a, 17b. The control valves 17a, 17b are configured as 3/5 way valves. The first fluid control valve 17a has three fluid ports 18a', 19a', 19b' and five control states 17a.1, 17a.2, 17a.3, 17a.4, 17a.5. The first fluid port 18a' of the first fluid control valve 17a is fluidly connected to the first fluid port 14a of the hydrostatic pump 4 through the fluid line 18a. The second fluid port 19a' and the third fluid port 19b' of the first control valve 17a are fluidly connected to the first fluid ports 15a, 16a of the hydrostatic units 5a, 5b through the fluid lines 19a, 19b, respectively.

In the first control state 17a.1, the first fluid port 18a' is fluidly connected to the second fluid port 19a' and to the third fluid port 19b'. In the second control state 17a.2, the first fluid port 18a' is fluidly connected to the second fluid port 19a' and fluidly disconnected from the third fluid port 19b'. In the third control state 17a.3, the first fluid port 18a' is fluidly disconnected from the second fluid port 19a' and fluidly connected to the third fluid port 19b'. In the fourth control state 17a.4, all fluid ports 18a', 19a', 19b' are fluidly disconnected from one another. In the fifth control state 17a.5, the second fluid port 19a' is fluidly connected to the third fluid port 19b', and the first fluid port 18a' is fluidly disconnected from both the second fluid port 19a' and the third fluid port 19b'.

The second fluid control valve 17b has three fluid ports 18b', 20a', 20b' and five control states 17b.1, 17b.2, 17b.3, 17b.4, 17b.5. The first fluid port 18b' of the second fluid control valve 17b is fluidly connected to the second fluid port 14b of the hydrostatic pump 4 through the fluid line 18b. The second fluid port 20a' and the third fluid port 20b' of the second control valve 17b are fluidly connected to the second fluid ports 15b, 16b of the hydrostatic units 5a, 5b through the fluid lines 20a, 20b, respectively. Regarding the control states 17b.1, 17b.2, 17b.3, 17b.4, 17b.5 of the second fluid control valve 17b, the configurations are analogous to those described in regard to the first fluid control valve 17a, mutatis mutandis.

The fluid control valves 17a, 17b may be controlled such that the fluid control valves 17a, 17b are simultaneously in their respective first control states 17a.1, 17b.1; in their respective second control states 17a.2, 17b.2; in their respective third control states 17a.3, 17b.3; in their respective fourth control states 17a.4, 17b.4; or in their respective fifth control states 17a.5, 17b.5. In the first configuration (simultaneously 17a.1, 17b.1), the hydrostatic units 5a, 5b are in parallel fluid communication with the hydrostatic pump 4. In the second configuration (simultaneously 17a.2, 17b.2), the hydrostatic pump 4 is fluidly connected to the first hydrostatic unit 5a and fluidly disconnected from the second hydrostatic unit 5b. In the third configuration (simultaneously 17a.3, 17b.3), the hydrostatic pump 4 is fluidly disconnected from the first hydrostatic unit 5a and fluidly connected to the second hydrostatic unit 5b. In the fourth configuration (simultaneously 17a.4, 17b.4), the hydrostatic pump 4 is fluidly disconnected from the first hydrostatic unit 5a and from the second hydrostatic unit 5b. In the fifth configuration (simultaneously 17a.5, 17b.5), the hydrostatic pump 4 is fluidly disconnected from the first hydrostatic unit 5a and from the second hydrostatic unit 5b while the first ports 15a, 16a and the second ports 15b, 16b of the hydrostatic units 5a, 5b are fluidly connected to each other, respectively.

The different configurations of the fluid control valves 17a, 17b described above correspond to different modes of splitting the mechanical energy provided by the power source 3 between the hydrostatic units 5a, 5b and of transmitting it to the output shafts 22a, 22b of the hydrostatic units 5a, 5b. The splitting of the mechanical energy provided by the power source 3 between the hydrostatic units 5a, 5b and of transmitting it to the output shafts 22a, 22b may further be influenced by varying the hydraulic displacement of at least one of or each of the hydrostatic pump 4, the first hydrostatic unit 5a and the second hydrostatic unit 5b.

The output shaft 22a of the first hydrostatic unit 5a is adapted to be selectively drivingly engaged with a first differential 10a of the first axle 11a through a first clutching device 24a. The first clutching device 24a includes multiple plates fixed to the output shaft 22a of the first hydrostatic unit 5a and corresponding plates fixed to an output shaft 25a of the first clutching device 24a. The output shafts 22a, 25a may be locked to one another by engaging the corresponding plates. The output shaft 25a of the first clutching device 24a is in direct driving engagement with the first differential 10a through an input gear 23a of the first differential 10a. In particular, the output shaft 25a is directly engaged with the input gear 23a of the first differential 10a. The transmission between the output shaft 22a of the first hydrostatic unit 5a and the first differential 10a includes no driveshaft, no mechanical gearbox and no bevel set.

The output shaft 22b is in direct driving engagement with the second differential 10b of the second axle 11b through an input gear 23b of the second differential 10b. The transmission between the output shaft 22b of the second hydrostatic unit 5b and the second differential 10b, too, includes no driveshaft, no mechanical gearbox and no bevel set. In an alternative embodiment not explicitly depicted here the output shaft 22b of the second hydrostatic unit 5b could likewise be selectively engageable with the second axle 11b through a second clutching device.

A first reduction ratio between the output shaft 22a of the first hydrostatic unit 5a and the first axle 11a may be different from a second reduction ratio between the output shaft 22b of the second hydrostatic unit 5b and the second axle 11b. For example, the first reduction ratio may be smaller than the second reduction ratio.

The dual drive driveline 201 further includes a control unit 30. The control unit 30 is adapted to electronically control the actuators 13, 21a, 21b for varying the hydraulic displacement of the hydrostatic pump 4 and the hydrostatic units 5a, 5b. Controlling the actuators 13, 21a, 21b includes determining displacement values of the hydrostatic pump 4 and the hydrostatic units 5a, 5b and tuning the displacement of the hydrostatic pump 4 and the hydrostatic units 5a, 5b to the determined displacement values. The control unit 30 is further adapted to electronically control the fluid control valves 17a, 17b. Controlling the fluid control valves 17a, 17b includes determining, for each of the fluid control valves 17a, 17b, one of the above described control states and switching the fluid control valves 17a, 17b to the determined control states. The control unit 30 is further adapted to electronically control the first clutching device 24a. Controlling the first clutching device 24a includes determining an engagement state of the first clutching device 24a and setting the first clutching device 24a to the determined engagement state. The engagement states include a first engagement state in which the output shaft 22a of the first hydrostatic unit 5a is drivingly engaged with the first differential 10a and a second engagement state in which the output shaft 22a of the first hydrostatic unit 5a is disengaged from the first differential 10a.

The control unit 30 is adapted to control the actuators 13, 21a, 21b, the fluid control valves 17a, 17b and the first clutching device 24a based on a control algorithm. The control algorithm uses one or several sensor signals as inputs. The sensor signals are detected using one or several sensors which are electrically connected to the control unit 30 (not shown). One of the sensor signals indicates the hydraulic displacement of the hydrostatic pump 4 and is detected using the actuator 13. Another sensor signal indicates the hydraulic displacement of the first hydrostatic unit 5a and is detected using the actuator 21a. Another sensor signal indicates the hydraulic displacement of the second hydrostatic unit 5b and is detected using the actuator 21a. Another sensor signal indicates a rotational speed of the power source output shaft and is detected using a rotational speed sensor 26. Another sensor signal indicates a rotational speed of the first axle 11a and is detected using a rotational speed sensor 27a. Another sensor signal indicates a rotational speed of the second axle and is detected using a rotational speed sensor 27b. Other sensor signals indicate a pneumatic pressure of the vehicle tires 12a, 12b and are detected using pneumatic pressure sensors 28a, 28b.

The control algorithm further uses a torque transmitted to the axles 11a, 11b as input values. The torque transmitted to the first axle 11a can be determined based on the hydraulic displacement of the hydrostatic pump 4, based on the hydraulic displacement of the first hydrostatic unit 5a, and based on the first reduction ratio between the first hydrostatic unit 5a and the first axle 11a, for example. The torque transmitted to the second axle 11b can be determined based on the hydraulic displacement of the hydrostatic pump 4, based on the hydraulic displacement of the second hydrostatic unit 5b, and based on the second reduction ratio between the second hydrostatic unit 5b and the second axle 11b, for example.

Thus, as compared to the dual drive driveline according the prior art depicted in FIG. 1 which includes the summing gearbox 6, the driveshafts 8a, 8b and the bevel sets 9a, 9b described above, the dual drive driveline 201 according to the present invention features a much more efficient transmission between the hydrostatic units 5a, 5b and the axles 11a, 11b. Due to the smaller number of mechanical parts used for coupling the hydrostatic units 5a, 5b to the axles 11a, 11b overall losses in the transmission are significantly reduced. Due to the multitude of possibilities of splitting the mechanical energy provided by the power source 3 or a portion of that energy between the hydrostatic units 5a, 5b and of providing different output torques at the axles 11a, 11b, the dual drive driveline 201 according to the present invention features a high degree of flexibility. Due to the above described functionality of the control unit 30, the dual drive driveline 201 according to the present invention can be easily adapted to a large variety of different driving conditions.

Figure 4:
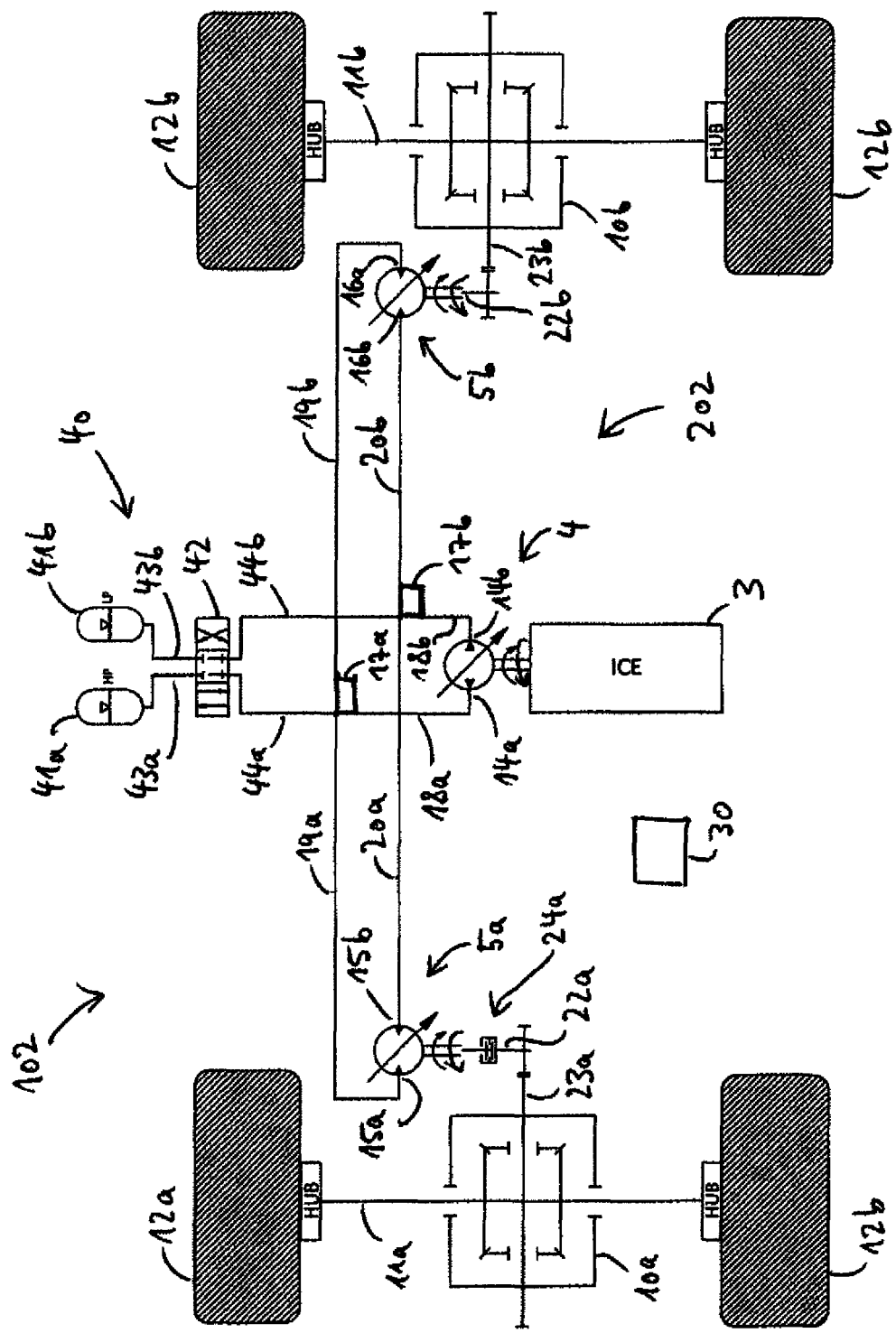
FIG. 4 shows a vehicle featuring the dual drive driveline of FIGS. 2 and 3, the driveline additionally including a hydraulic accumulator assembly in fluid communication with the hydrostatic pump and the hydrostatic units through an accumulator valve.

FIG. 4 depicts a vehicle 102, for example a tractor, featuring another dual drive driveline 202 in accordance with the present invention. The dual drive driveline 202 comprises all features of the dual drive driveline 201 depicted in FIGS. 2 and 3 and described above. However, for matters of clarity and simplicity not all features of the dual drive driveline 202 are marked with reference numerals in FIG. 4. Only those features of the dual drive driveline 202 which are not already included in the dual drive driveline 201 of FIGS. 2 and 3 will be explained.

In addition to the features already present in the dual drive driveline 201, the dual drive driveline 202 comprises a hydraulic accumulator assembly 40 including a high pressure accumulator 41a and a low pressure accumulator 41b, an accumulator valve 42 for selectively fluidly connecting the hydraulic accumulator assembly 40 to the hydrostatic pump 4 and the hydrostatic units 5a, 5b, and fluid lines 43a, 43b, 44a, 44b. The high pressure accumulator 41a and the low pressure accumulator 41b are configured as hollow vessels. A quantity of gas within the high pressure accumulator 41a is compressed when hydraulic fluid enters the high pressure accumulator 41a. Analogously, a quantity of gas within the low pressure accumulator 41b is compressed when hydraulic fluid enters the low pressure accumulator 41b. Typically, the hydraulic accumulator assembly is operated such that the hydrostatic pressure within the high pressure accumulator 41a is above the hydrostatic pressure in the hydraulic circuit including the hydrostatic units 5a, 5b; and that the hydrostatic pressure within the low pressure accumulator 41b is below the hydrostatic pressure in the hydraulic circuit including the hydrostatic units 5a, 5b.

Figure 5:
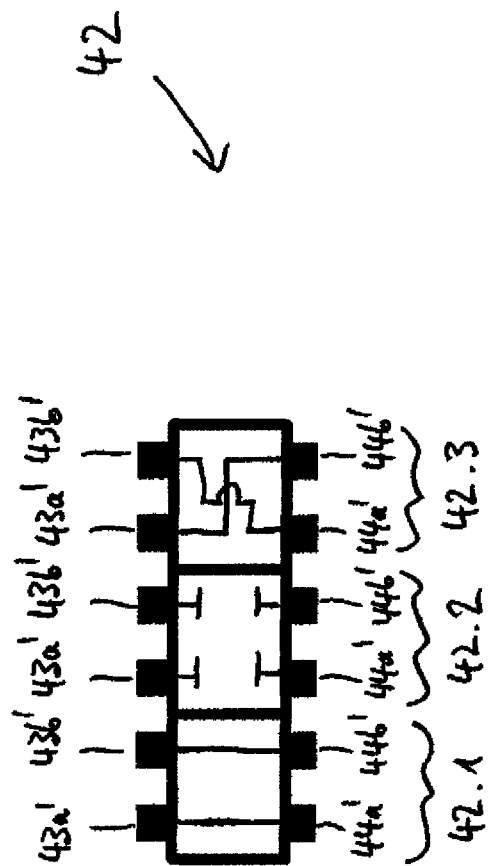
FIG. 5 shows a detailed view of the accumulator valve of the driveline of FIG. 4.

The accumulator valve is depicted in detail in FIG. 5. The accumulator valve 42 is configured as a 4/3 way valve having four fluid ports 43a', 43b', 44a', 44b' and three control positions 42.1, 42.2, 42.3. The first fluid port 43a' is fluidly connected to the high pressure accumulator 41a through the fluid line 43a. The second fluid port 43b' is fluidly connected to the low pressure accumulator 41b through the fluid line 43b. The third fluid port 44a' is fluidly connected to the first fluid port 19a' of the first fluid control valve 17a through the fluid line 44a; to the first fluid port 15a of the first hydrostatic unit 5a through the fluid lines 44a, 19a; and to the first fluid port 16a of the second hydrostatic unit 5b through the fluid lines 44a, 19b and the fluid ports 19a', 19b' of the first fluid control valve 17a. The fourth fluid port 44b' is fluidly connected to the first fluid port 20a' of the second fluid control valve 17b through the fluid line 44b; to the second fluid port 15b of the first hydrostatic unit 5a through the fluid lines 44b, 20a; and to the second fluid port 16b of the second hydrostatic unit 5b through the fluid lines 44b, 20b and the fluid ports 20a', 20b' of the second fluid control valve 17b.

In the first control position 42.1, the first fluid port 43a' is fluidly connected to the third fluid port 44a' and fluidly disconnected from the second fluid port 43b' and from the fourth fluid port 44b'; and, still in the first control position 42.a, the second fluid port 43b' is fluidly connected to the fourth fluid port 44b' and fluidly disconnected from the first fluid port 43a' and from the third fluid port 44a', In the second control position 42.2, all fluid ports 43a', 43b', 44a', 44b' are fluidly disconnected from one another. In the third control position 42.3, the first fluid port 43a' is fluidly connected to the fourth fluid port 44b' and fluidly disconnected from the second fluid port 43b' and from the third fluid port 44a'; and, still in the third control position 42.3, the second fluid port 43*b*' is fluidly connected to the third fluid port 44*a*' and fluidly disconnected from the first fluid port 43*a*' and from the fourth fluid port 44*b*'.

The hydrostatic accumulator 40, the accumulator valve 42, the hydrostatic units 5*a*, 5*b* and the fluid lines 43*a*, 43*b*, 44*a*, 44*b* are connected such that, when the accumulator valve 42 is in the second control position 42.2, the hydraulic accumulator assembly 40 is fluidly disconnected from the hydrostatic pump 4 and from the hydrostatic units 5*a*, 5*b*; when the accumulator valve 42 is in the first control position 42.1, the accumulator valve 42 fluidly connects the high pressure accumulator 41*a* to the first fluid ports 15*a*, 16*a* of the hydrostatic units 5*a*, 5*b*, and fluidly connects the low pressure accumulator 41*b* to the second fluid ports 15*b*, 16*b* of the hydrostatic units 5*a*, 5*b*; and, when the accumulator valve 42 is in the third control position 42.3, the accumulator valve 42 fluidly connects the high pressure accumulator 41*a* to the second fluid ports 15*b*, 16*b* of the hydrostatic units 5*a*, 5*b*, and fluidly connects the low pressure accumulator 41*b* to the first fluid ports 15*a*, 15*b* of the hydrostatic units 5*a*, 5*b*. At the same time, the third fluid port 44*a*' of the accumulator valve 42 may be fluidly connected to the first fluid port 14*a* of the hydrostatic pump 4 through the first fluid control valve 17*a*; and the fourth fluid port 44*b*' of the accumulator valve 42 may be fluidly connected to the second fluid port 14*b* of the hydrostatic pump 4 through the second fluid control valve 17*b*.

The control unit 30 is adapted to control the accumulator valve 42. Controlling the accumulator valve 42 includes determining one of the control positions 42.1, 42.2, 42.3 of the accumulator valve 42 and switching the accumulator valve 42 to the determined control position. The control unit 30 is adapted to control the accumulator valve based on the above described control algorithm. When controlling the accumulator valve 42, the control algorithm may use the previously described sensor signals and input variables as inputs.

Depending on at least one of or all of the control position of the accumulator valve 42, the control state of the first and the second fluid control valve 17*a*, 17*b*, the hydrostatic pressure in the accumulators 41*a*, 41*b*, and the hydrostatic pressure in the hydraulic circuit including the hydrostatic units 5*a*, 5*b*, hydrostatic energy stored in the hydraulic accumulator assembly 40 may be transferred to the hydrostatic units 5*a*, 5*b* and converted to mechanical energy by discharging the hydraulic accumulator assembly. Discharging the hydraulic accumulator assembly 40 typically includes lowering the hydrostatic pressure in the high pressure accumulator 41*a* and raising the hydrostatic pressure in the low pressure accumulator 41*b*. For example, the control unit 30 may be adapted to control the accumulator valve 42 such that, when a high output torque is required at the first axle 11*a* and/or at the second axle 11*b*, hydrostatic energy stored in the accumulator assembly 40 is diverted from the accumulator assembly 40 to one of or both of the first hydrostatic units 5*a*, 5*b*. To this end, the control unit 30 may switch the accumulator valve 42 to the first control position 42.1.

In the reverse direction, mechanical energy provided by the hydrostatic pump 4 and/or the hydrostatic units 5*a*, 5*b* may be converted to hydrostatic energy which may be stored in the accumulators 41*a*, 41*b*, thereby charging the accumulators 41*a*, 41*b*. Charging the accumulators 41*a*, 41*b* typically includes raising the hydrostatic pressure in the high pressure accumulator 41*a* and lowering the hydrostatic pressure in the low pressure accumulator 41*b*. In order to charge the accumulator assembly 40, the control unit 30 may be adapted to switch the accumulator valve 42 to the third control position 42.3, for example when the vehicle 102 is decelerating. In this case, the reversible hydrostatic units 5*a*, 5*b* are used as pumps drawing hydraulic liquid from the low pressure accumulator 41*b* and pumping hydraulic liquid into the high pressure accumulator 41*a*, thereby increasing the pressure gradient between the accumulators 41*a*, 41*b*.

The control unit 30 may be adapted to control the accumulator valve 42 and the fluid control valves 17*a*, 17*b* such that each of the three control positions 42.1, 42.2, 42.3 of the accumulator valve 42 may be combined with each of the five control states 17*a*.1, 17*b*.1; 17*a*.2, 17*b*.2; 17*a*.3, 17*b*.3; 17*a*.4, 17*b*.4; 17*a*.5, 17*b*.5 of the fluid control valves 17*a*, 17*b*. In this manner, the hydrostatic pump 4 and/or the accumulator assembly 40 may be used for driving the first hydrostatic unit 5*a* and/or the second hydrostatic unit 5*b*. Likewise, at least one of or all of the hydrostatic pump and the hydrostatic units 5*a*, 5*b* may be used to charge the hydraulic accumulator assembly 40. From the detailed description of the valves 42, 17*a*, 17*b* and their connections with the hydrostatic pump 4, the hydrostatic units 5*a*, 5*b* and the accumulator assembly 40, a skilled person can easily infer the valve configuration corresponding to a particular driving/charging mode. For example, in order to drive both hydrostatic units 5*a*, 5*b* using the hydrostatic pump 4 and the accumulator assembly 40, the control unit 30 switches the accumulator valve 42 to the first control position 42.1 and, simultaneously, switches the fluid control valves 17*a*, 17*b* to the first control state 17*a*.1, 17*b*.1, and so forth.

Figure 6:
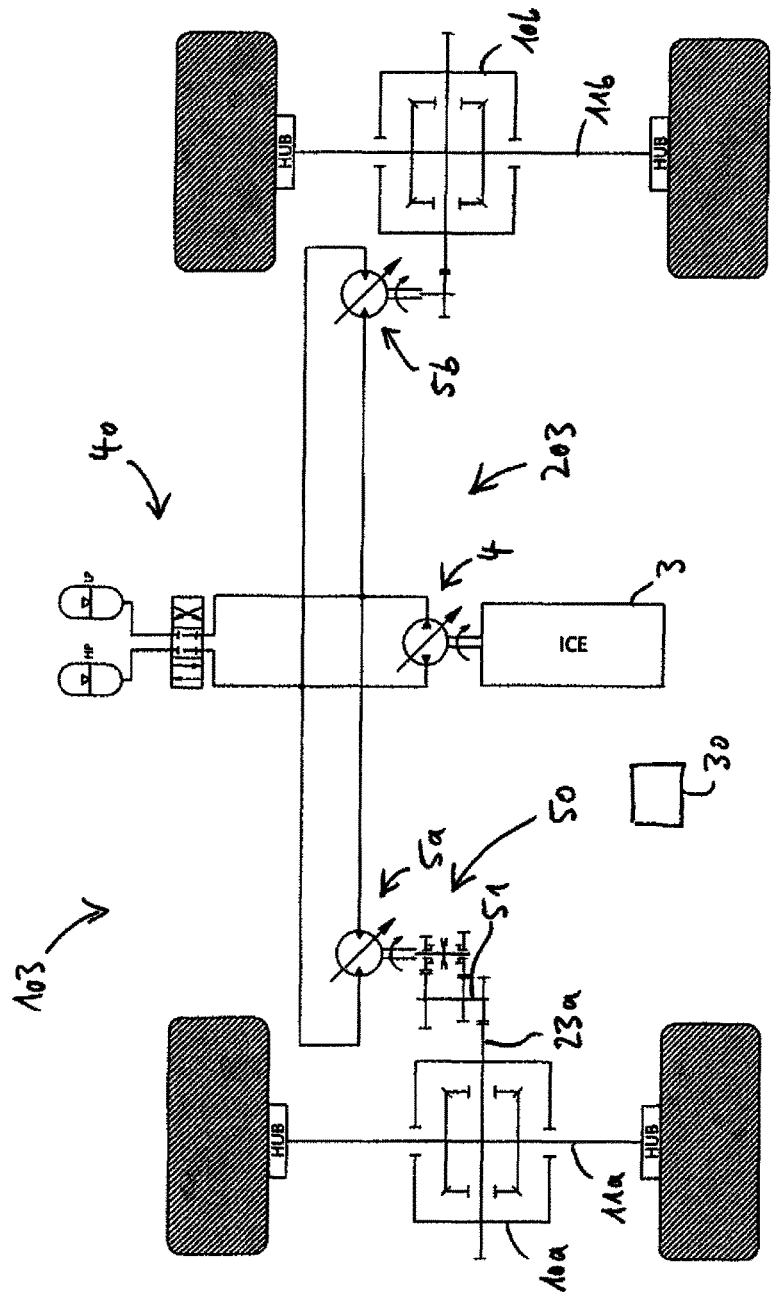
FIG. 6 shows a vehicle featuring the dual drive driveline of FIGS. 4 and 5, the driveline additionally including a mechanical gearbox for varying a gear ratio.

FIG. 6 depicts a vehicle 103, for example a dumper, featuring another dual drive driveline 203 in accordance with the present invention. In the dual drive driveline 203, the first clutching device 24*a* according to the dual drive driveline 202 is replaced by a first mechanical gearbox 50 with two-ratio capability. Otherwise, the dual drive driveline 203 comprises all features of the dual drive driveline 202 depicted in FIGS. 4 and 5 and described above. However, for matters of clarity and simplicity not all features of the dual drive driveline 203 are marked with reference numerals in FIG. 6. Only those features of the dual drive driveline 203 which are not already included in the dual drive driveline 202 of FIGS. 4 and 5 will be explained.

In FIG. 6, the first hydrostatic unit 5*a* is drivingly engaged with the first axle 11*a* through the first mechanical gearbox 50, wherein an output shaft 51 of the first mechanical gearbox is in direct driving engagement with the first differential 10*a* of the first axle 11*a* through the input gear 23*a*. The mechanical gearbox 50 may be configured to engage the output shaft 22*a* of the first hydrostatic unit 5*a* with the first differential 10*a* according to a first gear ratio and according to a second gear ratio. The first gear ratio of the mechanical gearbox 50 may be used when the vehicle 103 is driving at low speed, for example below a first (low) threshold speed, and when a high torque is required at the first axle 11*a*, for example a torque above a second (high) threshold torque. The second gear ratio of the mechanical gearbox 50 may be used when the vehicle 103 is driving at medium speed, for example above the first (low) threshold speed and below a second (high) threshold speed, the second threshold speed being higher than the first threshold speed; and when a medium torque is required at the first axle 11*a*, for example torque below the second (high) threshold torque and above a first (low) threshold torque. The mechanical gearbox 50 may further include a neutral gear. When the mechanical gearbox 50 is in the neutral gear, the first hydrostatic unit 5*a* and the first axle 11*a* are disengaged, that is the vehicle 103 is driven using the second hydrostatic unit 5b and the second axle 11b only. The neutral gear of the mechanical gearbox 50 may be used when the vehicle 103 is driving at high speed, for example above the second (high) threshold speed, and when only a low torque is required. In alternative embodiments not explicitly depicted here, the second hydrostatic unit 5b may likewise be drivingly engaged with the second axle 11b through a corresponding second mechanical gearbox with two-ratio capability.

The control unit 30 is adapted to control the mechanical gearbox 50. Controlling the mechanical gearbox 50 includes determining one of the gear ratios of the mechanical gearbox 50 (i.e. first ratio, second ratio, and neutral) and engaging the first hydrostatic unit 5a with the first differential 10a using the determined gear ratio of the mechanical gearbox 50. The control unit 30 is adapted to control the mechanical gearbox 50 based on the above described control algorithm. When controlling the mechanical gearbox 50, the control algorithm may use the previously described sensor signals and input variables as inputs.

The invention claimed is:

1. A dual drive driveline for a vehicle, the driveline comprising:
 a power source;
 a hydrostatic pump drivingly engaged with the power source;
 a first axle;
 a second axle;
 a first hydrostatic unit in fluid communication with the hydrostatic pump, the first hydrostatic unit being drivingly engaged or selectively drivingly engaged with the first axle, and the first hydrostatic unit not being drivingly engageable with the second axle;
 a second hydrostatic unit in fluid communication with the hydrostatic pump, the second hydrostatic unit being drivingly engaged or selectively drivingly engaged with the second axle, and the second hydrostatic unit not being drivingly engageable with the first axle;
 wherein at least one of:
 a. an output shaft of the first hydrostatic unit or an output shaft of a first clutching device selectively drivingly engaged with the output shaft of the first hydrostatic unit is in direct driving engagement with the first axle or with a first differential of the first axle, and
 b. an output shaft of the second hydrostatic unit or an output shaft of a second clutching device selectively drivingly engaged with the output shaft of the second hydrostatic unit is in direct driving engagement with the second axle or with a second differential of the second axle;
 the dual drive driveline further comprising:
 a control unit, the control unit being adapted to control a hydraulic displacement of at least one of the hydrostatic pump, the first hydrostatic unit and the second hydrostatic unit;
 a hydraulic accumulator assembly in fluid communication with at least one of or each of the hydrostatic pump, the first hydrostatic unit, and the second hydrostatic unit; and
 at least one accumulator valve for selectively fluidly connecting the hydraulic accumulator assembly to at least one of or each of the hydrostatic pump, the first hydrostatic unit and the second hydrostatic unit, the accumulator valve having at least a first control position, a second control position and a third control position;
 wherein, when the accumulator valve is in the second control position, the hydraulic accumulator assembly is fluidly disconnected from the hydrostatic pump, the first hydrostatic unit and the second hydrostatic unit; and
 wherein, when the accumulator valve is in the first control position or in the third control position, the hydraulic accumulator assembly is in parallel fluid communication with the hydrostatic pump, the first hydrostatic unit and the second hydrostatic unit.

2. The dual drive driveline according to claim 1,
 further including a first mechanical gearbox with two-ratio capability, wherein the first hydrostatic unit is selectively drivingly engaged with the first axle through the first mechanical gearbox, and wherein an output shaft of the first mechanical gearbox is in direct driving engagement with a first differential of the first axle; and/or
 further including a second mechanical gearbox with two-ratio capability, wherein the second hydrostatic unit is selectively drivingly engaged with the second axle through the second mechanical gearbox, and wherein an output shaft of the second mechanical gearbox is in direct driving engagement with a second differential of the second axle.

3. The dual drive driveline according to claim 1, wherein the first hydrostatic unit and the second hydrostatic unit are in parallel fluid communication with the hydrostatic pump.

4. The dual drive driveline according to claim 1, further comprising at least one fluid control valve adapted to selectively fluidly connect the hydrostatic pump to the first hydrostatic unit and/or to the second hydrostatic unit, the fluid control valve having at least a first control state, a second control state and a third control state;
 wherein, when the fluid control valve is in the first control state, the hydrostatic pump is in parallel fluid communication with the first hydrostatic unit and the second hydrostatic unit;
 wherein, when the fluid control valve is in the second control state, the hydrostatic pump is in fluid communication with the first hydrostatic unit and fluidly disconnected from the second hydrostatic unit; and
 wherein, when the fluid control valve is in the third control state, the hydrostatic pump is in fluid communication with the second hydrostatic unit and fluidly disconnected from the first hydrostatic unit.

5. The dual drive driveline according to claim 4,
 wherein the at least one fluid control valve includes a first fluid control valve and a second fluid control valve;
 wherein the hydrostatic pump, the first hydrostatic unit and the second hydrostatic unit each have a first fluid port and a second fluid port, the first fluid control valve being adapted to selectively fluidly connect the first fluid port of the hydrostatic pump to the first fluid port of the first hydrostatic unit and/or to the first fluid port of the second hydrostatic unit, and the second fluid control valve being adapted to selectively fluidly connect the second fluid port of the hydrostatic pump to the second fluid port of the first hydrostatic unit and/or to the second fluid port of the second hydrostatic unit;
 wherein, in the first control state, the first fluid control valve fluidly connects the first fluid port of the hydrostatic pump to the first fluid ports of the first and the second hydrostatic unit, and the second fluid control valve fluidly connects the second fluid port of the hydrostatic pump to the second fluid ports of the first and the second hydrostatic unit;
 wherein, in the second control state, the first fluid control valve and the second control valve fluidly connect the first and the second fluid port of the hydrostatic pump to the first and the second fluid port of the first hydrostatic unit, and fluidly disconnect the hydrostatic pump from the second hydrostatic unit; and wherein, in the third control state, the first fluid control valve and the second control valve fluidly connect the first and the second fluid port of the hydrostatic pump to the first and the second fluid port of the second hydrostatic unit, and fluidly disconnect the hydrostatic pump from the first hydrostatic unit.

6. The dual drive driveline according to claim 1, wherein the hydraulic accumulator assembly comprises at least one high pressure accumulator and at least one low pressure accumulator;

wherein the hydrostatic pump, the first hydrostatic unit and the second hydrostatic unit each have a first fluid port and a second fluid port; and wherein, when the accumulator valve is in the first control position, the accumulator valve fluidly connects the high pressure accumulator to the first fluid ports of the hydrostatic pump and the hydrostatic units, and fluidly connects the low pressure accumulator to the second fluid ports of the hydrostatic pump and the hydrostatic units; and wherein, when the accumulator valve is in the third control position, the accumulator valve fluidly connects the high pressure accumulator to the second fluid ports of the hydrostatic pump and the hydrostatic units, and fluidly connects the low pressure accumulator to the first fluid ports of the hydrostatic pump and the hydrostatic units.

7. The dual drive driveline according to claim 1, wherein the control unit is adapted to control at least one control device based on at least one sensor signal;

wherein the control device includes at least one of or each of:

an actuator for controlling the hydraulic displacement of the hydrostatic pump;

an actuator for controlling the hydraulic displacement of the first hydrostatic unit;

an actuator for controlling the hydraulic displacement of the second hydrostatic unit;

at least one fluid control valve for selectively fluidly connecting the hydrostatic pump to the first hydrostatic unit and/or to the second hydrostatic unit;

an accumulator valve for selectively fluidly connecting a hydraulic accumulator assembly to at least one of or each of the hydrostatic pump, the first hydrostatic unit and the second hydrostatic unit;

a first clutching device for selectively drivingly engaging the first hydrostatic unit with the first axle; and a second clutching device for selectively drivingly engaging the second hydrostatic unit with the second axle;

a first mechanical gearbox with two-ratio capability, the first hydrostatic unit being drivingly engaged with the first axle through the first mechanical gearbox; and a second mechanical gearbox with two-ratio capability, the second hydrostatic unit being drivingly engaged with the second axle through the second mechanical gearbox; and wherein the sensor signal indicates at least one of or each of:

the hydraulic displacement of the hydrostatic pump;

the hydraulic displacement of the first hydrostatic unit;

the hydraulic displacement of the second hydrostatic unit;

a rotational speed of an output shaft of the power source;

a rotational speed of the first axle;

a rotational speed of the second axle;

a hydrostatic pressure of a high pressure accumulator;

a hydrostatic pressure of a low pressure accumulator; and a pneumatic pressure of at least one vehicle tire.

* * * * *